United States Patent
Han et al.

(10) Patent No.: US 9,156,009 B2
(45) Date of Patent: Oct. 13, 2015

(54) MEMBRANE, METHOD FOR MANUFACTURING THE SAME, AND COMPOSITE MEMBRANE INCLUDING THE SAME

(75) Inventors: Jung Im Han, Yongin-si (KR); Hyo Kang, Seoul (KR); Sung Soo Han, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 731 days.

(21) Appl. No.: 13/330,015

(22) Filed: Dec. 19, 2011

(65) Prior Publication Data

US 2012/0267304 A1    Oct. 25, 2012

(30) Foreign Application Priority Data

Apr. 20, 2011    (KR) .................. 10-2011-0036768

(51) Int. Cl.
| | |
|---|---|
| *B01D 71/42* | (2006.01) |
| *B01D 71/80* | (2006.01) |
| *B01D 61/00* | (2006.01) |

(Continued)

(52) U.S. Cl.
CPC .............. *B01D 71/80* (2013.01); *B01D 61/002* (2013.01); *B01D 67/0013* (2013.01); *B01D 67/0016* (2013.01); *B01D 71/28* (2013.01); *B01D 71/32* (2013.01); *B01D 71/42* (2013.01); *B01D 2323/04* (2013.01); *B01D 2325/022* (2013.01)

(58) Field of Classification Search
CPC .. B01D 71/42; B01D 61/002; B01D 67/0013; B01D 67/0011; B01D 71/76; C08F 220/44; C08F 216/16; C08F 214/14

USPC ............ 210/500.27, 490; 427/244, 243, 331; 526/293, 333, 342

See application file for complete search history.

(56) References Cited

U.S. PATENT DOCUMENTS

| | | | |
|---|---|---|---|
| 4,364,759 A | | 12/1982 | Brooks et al. |
| 4,720,345 A | * | 1/1988 | Linder et al. .................. 210/650 |

(Continued)

FOREIGN PATENT DOCUMENTS

| | | |
|---|---|---|
| DE | 10224225 A1 | 12/2003 |
| EP | 1832341 A1 | 9/2007 |

(Continued)

OTHER PUBLICATIONS

D.H. Kaelble, "Dispersion-Polar Surface Tension Properties of Organic Solids", (1970) Available Online Mar. 4, 2008, Journal of Adhesion 2:2, p. 66-81.

(Continued)

*Primary Examiner* — Mark Kaucher
(74) *Attorney, Agent, or Firm* — Harness, Dickey & Pierce, P.L.C.

(57) ABSTRACT

Example embodiments relate to a membrane, a method of manufacturing the same, and a composite membrane including the same. The membrane may include a polyacrylonitrile-based copolymer that includes a hydrophobic side chain and/or a hydrophobic repeating unit. The membrane may include a skin layer and a porous layer. A thickness ratio of the skin layer relative to the porous layer may be about 0.01 or less. The skin layer may have a thickness of about 1 μm or less. The membrane may have a relatively high water flux. When using the membrane, a water treatment module having higher energy efficiency may be achieved.

16 Claims, 7 Drawing Sheets

(51) Int. Cl.
B01D 67/00 (2006.01)
B01D 71/28 (2006.01)
B01D 71/32 (2006.01)

(56) References Cited

U.S. PATENT DOCUMENTS

| | | | |
|---|---|---|---|
| 4,792,404 A | 12/1988 | Swedo et al. | |
| 5,512,176 A | 4/1996 | Blair | |
| 5,679,254 A | 10/1997 | Chakrabarti | |
| 5,707,522 A * | 1/1998 | Maeda et al. | 210/500.23 |
| 6,306,491 B1 * | 10/2001 | Kram et al. | 428/315.5 |
| 7,445,712 B2 | 11/2008 | Herron | |
| 7,566,402 B2 | 7/2009 | Thorsen et al. | |
| 2004/0138323 A1 * | 7/2004 | Stenzel-Rosebaum et al. | 521/142 |
| 2005/0173803 A1 * | 8/2005 | Lu et al. | 257/759 |
| 2006/0157248 A1 | 7/2006 | Hoefer et al. | |
| 2008/0149561 A1 | 6/2008 | Chu et al. | |
| 2009/0078640 A1 | 3/2009 | Chu et al. | |
| 2010/0155329 A1 | 6/2010 | Iyer | |

FOREIGN PATENT DOCUMENTS

| | | |
|---|---|---|
| GB | 856327 | 12/1960 |
| JP | H06329855 A | 11/1994 |
| WO | WO-2007120631 A1 | 10/2007 |
| WO | WO-2008137082 A1 | 11/2008 |

OTHER PUBLICATIONS

Bumsuk Jung, "Preparation of hydrophilic polyacrylonitrile blend membranes for ultrafiltration", (2004), Journal of Membrane Science, 229, p. 129-136.

Dai, et al., "Surface glycosylation of polyacrylonitrile ultrafiltration membrane to improve its anti-fouling performance", (2008), Journal of Membrane Science, 325, p. 479-485.

Su, et. al., "Preparation of antifouling ultrafiltration membranes with poly (ethylene glycol)—graft—polyacrylonitrile copolymers", (2009), Journal of Membrane Science, 329, p. 246-252.

Solovskaja, et al., "Effect of the structure of 4-n-alkyl-styrenes on their free-radical copolymerization with acrylonitrile and some properties of the copolymers", Acta Polymerica 37 (1986), pp. 580-583.

"Characterization of novel forward osmosis hollow fiber membranes", 2010, Wang et al., Journal of Membrane Science 355, pp. 158-167.

"Influence of membrane support layer hydrophobicity on water flux in osmotically driven membrane processes", 2008, McMutcheon et al., Journal of Membrane Science 318, pp. 458-466.

M. Joshi, et al., "Development of a new styrene copolymer membrane for recycling of polyester fibre dyeing effluent," Journal of Membrane Science, vol. 189, pp. 23-40 (2001).

European Search Report dated Jul. 16, 2012 issued in corresponding European Application No. 12151220.6-2113.

Ageishi, et al., "Electron Transport across Polymeric Membranes Containing the Viologen Structure", Macromolecules, vol. 16, No. 6, 1983, American Chemical Society, pp. 884-887.

* cited by examiner

MEMBRANE, METHOD FOR MANUFACTURING THE SAME, AND COMPOSITE MEMBRANE INCLUDING THE SAME

CROSS-REFERENCE TO RELATED APPLICATION

This application claims priority under 35 U.S.C. §119 to Korean Patent Application No. 10-2011-0036768, filed in the Korean Intellectual Property Office on Apr. 20, 2011, the entire contents of which are incorporated herein by reference.

BACKGROUND

1. Field

Example embodiments herein relate to a membrane, a method of manufacturing the same, and a composite membrane including the same.

2. Description of the Related Art

To acquire fresh water or gray water from sea water or sewage and waste water, floating or dissolved components should be removed in conformity with the standards for drinking water. At present, reverse osmosis is conventionally used as a water treatment method for desalinating or making gray water out of sea water or sewage and waste water.

According to the water treatment method using a reverse osmotic membrane, a pressure corresponding to an osmotic pressure caused by the dissolved component is applied to the raw water to separate a dissolved component, such as a base (NaCl), from water. For example, the concentration of the base dissolved in sea water ranges from about 30,000 to about 45,000 ppm and the osmotic pressure caused from the concentration ranges from about 20 to about 30 atm. As a result, a pressure of about 20 to 30 atm or higher is applied to the raw water to produce fresh water from the raw water. Typically, energy in the amount of about 6 to about 10 kW/m³ is required to produce about 1 m³ of fresh water from sea water.

An energy recollection device has been developed and applied in an attempt to save the energy consumed during a reverse osmosis process. However, in this case, about 3 kW/m³ of energy is required to drive a motor of a high-pressure pump.

To resolve the problem, a water treatment process based on forward osmosis has been suggested as an alternative. The forward osmosis process is relatively economical compared with the reverse osmosis process, because the forward osmosis process does not require pressure but uses a natural osmosis phenomenon. Researchers have been studying the development of the forward osmosis process.

In the forward osmosis process, the chemical characteristics of a membrane are important as is the structure of the membrane. In the reverse osmosis process, since the water passing through the membrane is transported by pressure, the chemical characteristics of the membrane affects the water flux of the membrane less.

However, in the forward osmosis process, the water is spontaneously permeated to the membrane by the osmotic pressure difference, so the hydrophilicity of the membrane significantly affects the water flux. Accordingly, the hydrophilic degree of a polymer for the membrane may significantly affect the water flux of the membrane.

Accordingly, it may be favorable for the membrane to be fabricated using a hydrophilic polymer in view of the water flux of the membrane, but this may increase the thickness of a skin layer due to the hydrophilicity of the polymer when the membrane is fabricated according to a non-solvent induced phase separation (NIPS), which is a conventionally used method.

When the skin layer is thicker, the structural factor of the membrane is increased, which may decrease the water flux.

SUMMARY

Various embodiments relate to a membrane including a polyacrylonitrile-based copolymer.

Various embodiments relate to a method of manufacturing the membrane.

Various embodiments relate to a composite membrane including the membrane.

According to a non-limiting embodiment, a membrane including a polyacrylonitrile-based copolymer is provided. The polyacrylonitrile-based copolymer may include a hydrophobic side chain and/or a hydrophobic repeating unit. The membrane may include a skin layer and a porous layer. A thickness ratio of the skin layer relative to the porous layer may be about 0.01 or less. The skin layer may have a thickness of about 1 μm or less.

The membrane may have a structural factor (S) of about 500 μm or less.

The porous layer may have a porosity of about 0.5 or more, a tortuosity (τ) of about 2.5 or less, and a thickness (t) of about 200 μm or less.

The polyacrylonitrile copolymer may include a repeating unit represented by the following Chemical Formula 1, a repeating unit represented by the following Chemical Formula 2, and a repeating unit represented by the following Chemical Formula 3.

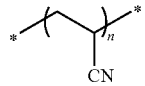

[Chemical Formula 1]

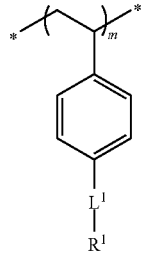

[Chemical Formula 2]

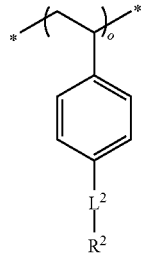

[Chemical Formula 3]

In Chemical Formulae 1 to 3, when the sum of n, m, and o is 1, n ranges from 0.5 to 0.99 and m+o ranges from 0.01 to 0.5, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent.

The copolymer may have a weight average molecular weight of about 10,000 to about 200,000.

The copolymer may have a polydispersity of about 1.0 to about 10.0.

The copolymer may include a repeating unit represented by the following Chemical Formula 4.

[Chemical Formula 4]

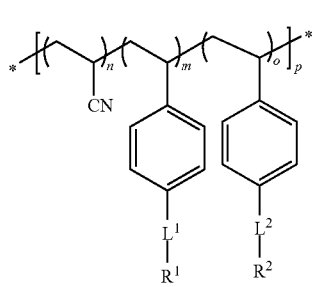

In Chemical Formula 4, when the sum of n, m, and o is 1, n ranges from 0.5 to 0.99 and m+o ranges from 0.01 to 0.5, p is an integer ranging from 10 to 10,000, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent.

The copolymer may include a repeating unit represented by the following Chemical Formula 5.

[Chemical Formula 5]

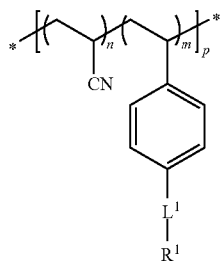

In Chemical Formula 5, when the sum of n and m is 1, n ranges from 0.5 to 0.99 and m ranges from 0.01 to 0.5, p is an integer ranging from 10 to 10,000, $L^1$ is —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, and $R^1$ is a hydrophilic or hydrophobic substituent.

The hydrophilic substituent may include —OH, —SH, —NH$_2$, —COOH, —SO$_3$H, a halogen, salts thereof, or a combination thereof, and the hydrophilic substituent may include a low molecular group, an oligomeric group, or a polymeric group.

The hydrophobic substituent may include a substituted or unsubstituted C1 to C10 alkyl group, a substituted or unsubstituted C5 to C30 aryl group, a fluorinated substituent thereof, or a combination thereof, and the hydrophobic substituent may be a low molecular group, an oligomeric group, or a polymeric group.

In the fluorinated substituent, the substituent may be a substituted or unsubstituted C1 to C10 alkyl group, a substituted or unsubstituted C5 to C30 aryl group, or a combination thereof.

According to another non-limiting embodiment, a method of manufacturing a membrane including a skin layer and a porous layer is provided that may include preparing a organic solution including about 5 wt % to about 30 wt % of a polyacrylonitrile-based copolymer, about 1 wt % to about 10 wt % of a pore-forming agent, and about 60 wt % to about 94 wt % of an organic solvent, applying the organic solution to a substrate, and/or dipping the substrate applied with the organic solution in a non-solvent.

A thickness ratio of the skin layer relative to the porous layer may be about 0.01 or less. The skin layer may have a thickness of 1 μm or less. The polyacrylonitrile-based copolymer may include a hydrophobic side chain and/or a hydrophobic repeating unit.

The membrane may have a structural factor (S) of about 500 μm or less.

The porous layer may have porosity of about 0.5 or more, a tortuosity of about 2.5 or less, and a thickness of about 200 μm or less.

The polyacrylonitrile copolymer may include a repeating unit represented by the following Chemical Formula 1, a repeating unit represented by the following Chemical Formula 2, and a repeating unit represented by the following Chemical Formula 3.

[Chemical Formula 1]

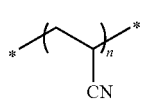

[Chemical Formula 2]

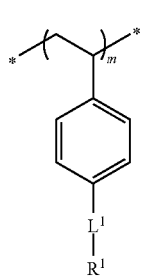

[Chemical Formula 3]

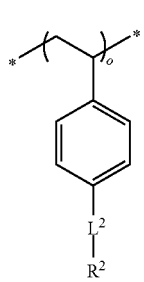

In Chemical Formulae 1 to 3, when the sum of n, m, and o is 1, n ranges from 0.5 to 0.99 and m+o ranges from 0.01 to 0.5, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent.

The process of applying the organic solution to a substrate may be a process of coating the substrate with the organic solution to a thickness of about 100 μm to about 300 μm.

The pore-forming agent may include polyvinylpyrrolidone, polyethylene glycol, polyethyloxazoline, glycerol, ethylene glycol, diethylene glycol, ethanol, methanol, acetone, phosphoric acid, acetic acid, propanoic acid, lithium chloride, lithium nitrate, lithium perchlorate, or a combination thereof.

The organic solvent may include dimethyl formamide, dimethylsulfoxide, dimethylacrylamide, methylpyrrolidone, or a combination thereof.

According to another non-limiting embodiment, a composite membrane is provided that may include a polymer layer, and a support disposed on one side or both sides of the polymer layer. The support may include the membrane according to example embodiments.

The support may have a thickness of about 0.01 μm to about 500 μm.

The polymer layer may be a microfiltration membrane, an ultrafiltration membrane, a nanofiltration membrane, a reverse osmotic membrane, or a forward osmotic membrane.

DETAILED DESCRIPTION

Figure 1:
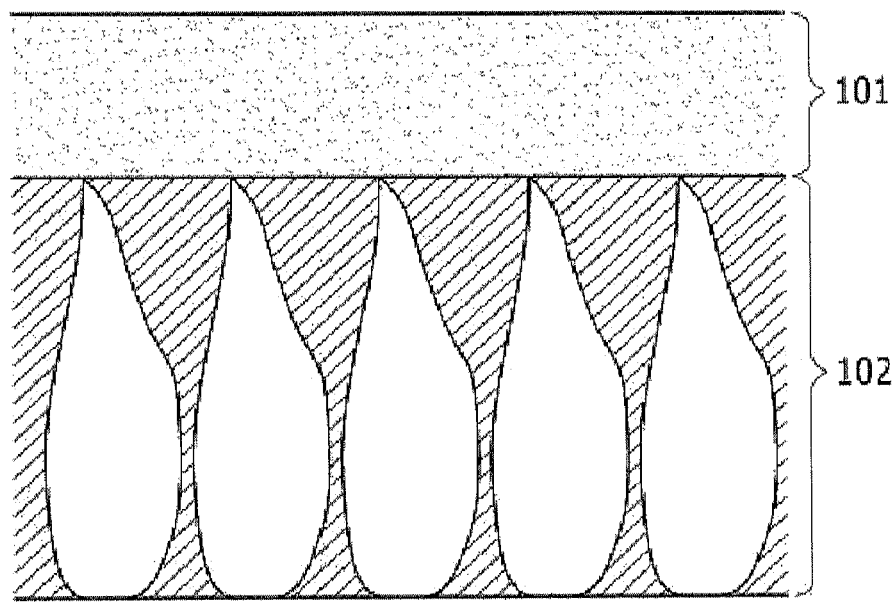
FIG. 1 is a cross-sectional view of a membrane including a skin layer and a porous layer.

This disclosure will be described more fully hereinafter with reference to the accompanying drawings, in which various example embodiments are shown. This disclosure may, however, be embodied in many different forms and is not to be construed as limited to the example embodiments set forth herein.

As used herein, when a definition is not otherwise provided, the term "substituted" may refer to one substituted with a C1 to C30 alkyl group, a C1 to C10 alkylsilyl group, a C3 to C30 cycloalkyl group, a C6 to C30 aryl group, a C2 to C30 heteroaryl group, a C1 to C10 alkoxy group, a fluoro group, a C1 to C10 trifluoroalkyl group such as a trifluoromethyl group, or a cyano group.

As used herein, when a definition is not otherwise provided, the term "hetero" may refer to a functional group including 1 to 3 heteroatoms selected from the group consisting of N, O, S, and P, with the remaining atoms being essentially carbon.

As used herein, when a definition is not otherwise provided, the term "combination thereof" refers to at least two substituents bound to each other by a linker, or at least two substituents condensed to each other.

As used herein, when a definition is not otherwise provided, the term "alkyl group" may refer to a "saturated alkyl group" without a double bond or a triple bond, or an "unsaturated alkyl group" including at least one of an alkenyl group or alkynyl group. The term "alkenyl group" may refer to a substituent in which at least two carbon atoms are bound in at least one carbon-carbon double bond, and the term "alkynyl group" may refer to a substituent in which at least two carbon atoms are bound in at least one carbon-carbon triple bond. The alkyl group may be a branched, linear, or cyclic group.

The alkyl group may be a C1 to C20 alkyl group, and more specifically a C1 to C6 alkyl group, a C7 to C10 alkyl group, or a C11 to C20 alkyl group.

For example, a C1-C4 alkyl may have 1 to 4 carbon atoms, and may be selected from the group consisting of methyl, ethyl, propyl, iso-propyl, n-butyl, iso-butyl, sec-butyl, and t-butyl.

Representative examples of an alkyl group may be selected from a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, or the like.

The term "aromatic group" may refer to a substituent including a cyclic structure where all elements have p-orbitals that form conjugation. For example, an aryl group and/or a heteroaryl group may be utilized.

The term "aryl group" may refer to a monocyclic or fused ring-containing polycyclic (i.e., rings sharing adjacent pairs of carbon atoms) groups.

The "heteroaryl group" may refer to one including 1 to 3 heteroatoms selected from N, O, S, or P in an aryl group, with the remaining atoms being essentially carbons. When the heteroaryl group is a fused ring, each ring may include 1 to 3 heteroatoms.

The term "spiro structure" refers to a cyclic structure having a contact point of one carbon. Further, the Spiro structure may be used as a compound including the spiro structure or a substituent including the Spiro structure.

In a non-limiting embodiment, a membrane including a polyacrylonitrile-based copolymer may be provided. The polyacrylonitrile-based copolymer may include a hydrophobic side chain or a hydrophobic repeating unit. The membrane may include a skin layer and a porous layer. A thickness ratio of the skin layer relative to the porous layer may be about 0.01 or less. The skin layer may have a thickness of about 1 μm or less.

FIG. 1 is a cross-sectional view of a membrane including a skin layer and a porous layer.

When the membrane is fabricated according to a non-solvent induced phase separation (NIPS), the membrane includes a skin layer 101 and a porous layer 102.

The skin layer 101 may be a layer having a relatively high density, and the porous layer 102 may be a layer having a relatively low density.

A structural factor (S) may be used to evaluate the water flux of a layer.

The structural factor (S) refers to the value considering factors affecting the structure when water is substantially permeated through the membrane.

The structural factor (S) may be represented by the following Equation 1.

$$S = \frac{\tau \cdot t}{\varepsilon} \quad \text{[Equation 1]}$$

In Equation 1, S is a structural factor of the membrane; $\varepsilon$ is a porosity of the membrane; $\tau$ is a tortuosity of the membrane; and t is a thickness of the membrane.

Hereinafter, the structural factor (S) is described in further detail.

First, the thickness (t) refers to a thickness of the membrane. When the thickness is increased, the distance of permeating water through the membrane is increased, so the structural factor (S) is increased. The unit of thickness is μm.

The tortuosity (τ) of the membrane is a ratio of the substantial transport passage of water in the membrane to the thickness of the membrane. The tortuosity of 1 means that water may vertically pass the membrane in the thickness direction of the membrane without resistance. If there is a structure that interferes with water transportation in the membrane (e.g., the membrane has a relatively high density), the tortuosity may be increased. Accordingly, the lowest value of tortuosity is 1, and the unit of measure does not exist since it is a ratio. If the tortuosity is increased, the structural factor (S) may be increased.

The porosity (ε) of the membrane refers to a ratio of pores to the inside volume of the membrane. In other words, a porosity of 1 means that the inside of the membrane is empty. If the porosity is decreased, this is considered to increase the density. When the porosity is increased, the factor of resistance of the water transfer is decreased, so the structural factor is decreased. The porosity is also a ratio, so it has no unit of measure.

If the structural factor of the membrane is evaluated when separating the skin layer 101 and the porous layer 102, it is understood that the structural factor of the skin layer 101 will have a greater impact on the total structural factor than the structural factor of the porous layer 102. In other words, the porous layer 102 will have less of an effect on the total structural factor of the membrane due to its relatively high porosity and its relatively low tortuosity.

In order to decrease the structural factor of the skin layer 101, it may be necessary to increase the porosity, decrease the tortuosity, and decrease the thickness.

Among the various factors, increasing the porosity and decreasing the tortuosity may not be as effective due to the characteristics of the skin layer 101 having a relatively high density.

Accordingly, decreasing the structural factor of the skin layer 101 may be more effectively performed by decreasing the thickness of the skin layer 101.

A membrane according to a non-limiting embodiment may have a ratio of thickness of the skin layer 101 to thickness of the porous layer 102 of about 0.01 or less, which effectively decreases the structural factor of the skin layer 101.

The structural factor (S) of the membrane may be about 500 μm or less, for example, about 250 μm or less or about 200 μm or less.

In addition, the porous layer 102 may have porosity (ε) of about 0.5 or more, a tortuosity (τ) of about 2.5 or less, and a thickness (t) of about 200 μm or less.

Within such ranges, a membrane satisfying the structural factor (S) range may be obtained.

The membrane may include a polyacrylonitrile-based copolymer. For example, it may provide a thinner skin layer 101 due to the polyacrylonitrile-based copolymer.

Figure 2:
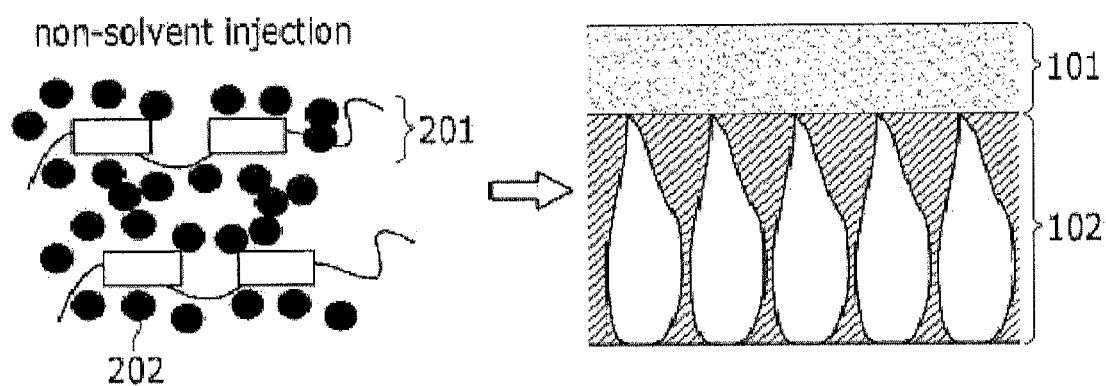
FIG. 2 is a schematic view illustrating a process for providing a membrane using a polyacrylonitrile homopolymer according to a non-solvent induced phase separation.
Figure 3:
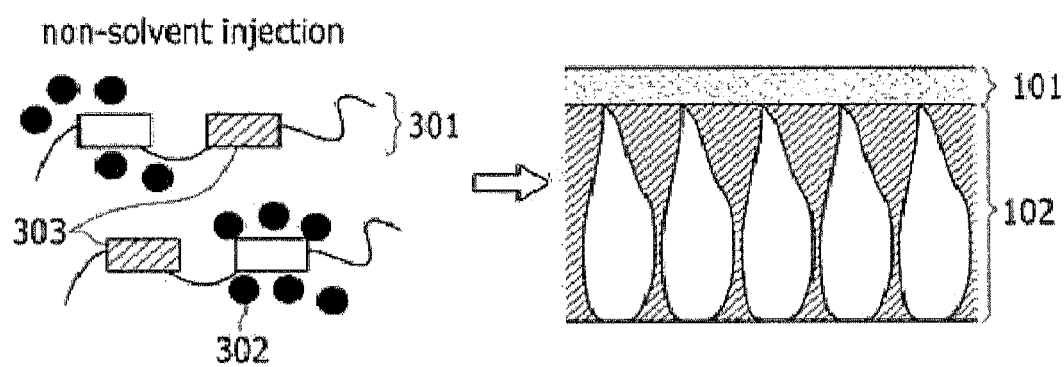
FIG. 3 is a schematic view illustrating a process for providing a membrane using a polyacrylonitrile copolymer according to a non-solvent induced phase separation.

FIGS. 2 and 3 are views showing a part of a process for providing a membrane according to a non-solvent induced phase separation.

For example, FIG. 2 is a view showing the step of dipping the polymer solution in the non-solvent while providing a membrane according to a non-solvent induced phase separation.

As shown in FIG. 2, since a polyacrylonitrile homopolymer 201 is strongly hydrophilic, it maintains a bond with a conventional solvent 202 even if dipped in the non-solvent, so the phase-transition between non-solvent and solvent is not effectively performed.

As a result, the non-solvent is insufficiently permeated to decrease the thickness of the porous layer that may be produced when the non-solvent is removed, and the thickness of the skin layer 101 may be relatively thicker. Thereby, the structural factor of the membrane is increased.

FIG. 3 is a view showing the step of dipping the copolymer solution in the non-solvent while providing a membrane according to a non-solvent induced phase separation.

As shown in FIG. 3, since a part of a repeating unit 303 of the polyacrylonitrile-based copolymer 301 is hydrophobic, it has a relatively weak bonding property with a solvent 302, so the phase transition with the non-solvent is more effectively generated.

As a result, the porous layer 102 may be more effectively produced, causing the thickness of the skin layer 101 to be decreased.

Therefore, the overall structural factors of the membrane may be decreased.

The hydrophilicity and hydrophobicity may be measured by a contact angle as follows.

Generally, a polyacrylonitrile homopolymer is known to have a relatively strong hydrophilic property. To manifest the hydrophilic property, a membrane is formed of a polyacrylonitrile homopolymer and used as a substrate, and a method of measuring a contact angle by dripping a water droplet on the surface of the substrate may be used.

The term "contact angle" used in the present specification is defined as follows.

Figure 4:
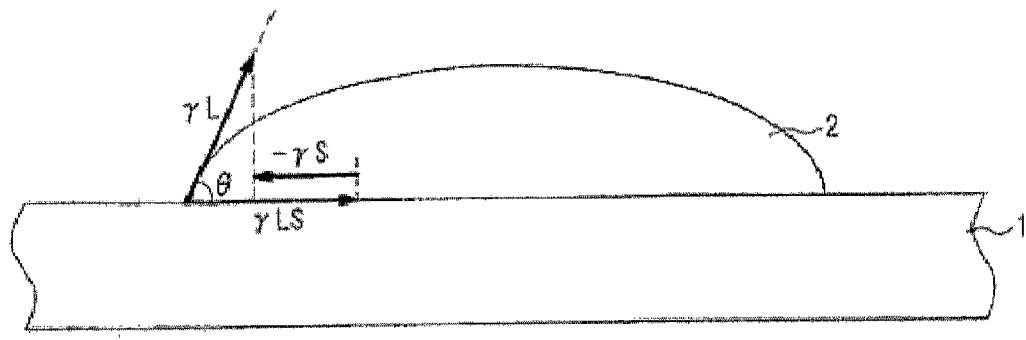
FIG. 4 is a schematic view illustrating a contact angle formed between the surface of a substrate and a droplet.

FIG. 4 is a schematic view illustrating a contact angle formed between the surface of a substrate and a droplet.

Generally, the shape of a bell-type droplet 2 existing on the surface of a substrate 1 may be defined as a contact angle (θ). The following Equation 2 (Young's Equation) is realized among the contact angle (θ), surface tension (γL) of a droplet, and surface energy (γS) of a substrate. In Equation 2, γLS denotes interface energy between the surface of the substrate 1 and the droplet 2.

$$\cos \theta = (\gamma S - \gamma LS)/\gamma L \quad \text{[Equation 2]}$$

γLS decreases along with a decrease of γS, and when γS is decreased, it is generally known that the decrease amount of γLS is smaller than γS (e.g., refer to D. T. Kaelble and J. Adhesion, Vol. 2 1970, pp. 66-81). Therefore, when the surface energy γS of the substrate 1 is decreased, the right side value of Equation 2 is decreased and the contact angle (θ) is increased. Therefore, the droplet 2 discharged onto the surface of the substrate 1 shrinks as time passes. Equation 2 may be represented by a vector as shown in FIG. 4.

In short, when the contact angle of the droplet 2 is small, it means that the droplet 2 is spread wide on the substrate 1 and this means that the substrate 1 and the droplet 2 have a chemical attraction with each other.

The contact angle of the polysulfone membrane with respect to water that is used for reverse osmosis at present is about 95°. The contact angle of the polyacrylonitrile membrane with respect to water is about 49°, which is more hydrophilic than a conventional membrane.

The polyacrylonitrile copolymer according to a non-limiting embodiment may have a contact angle of about 50° to 89°, or about 60° to 89°, about 70° to 89°, or about 73° to 89°.

The polyacrylonitrile copolymer may include a repeating unit represented by the following Chemical Formula 1, a repeating unit represented by the following Chemical Formula 2, and a repeating unit represented by the following Chemical Formula 3.

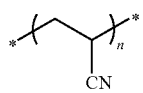

[Chemical Formula 1]

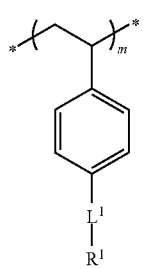

[Chemical Formula 2]

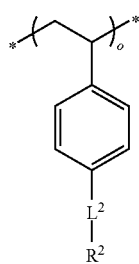

[Chemical Formula 3]

In Chemical Formulae 1 to 3, when the sum of n, m, and o is 1, n ranges from 0.5 to 0.99 and m+o ranges from 0.01 to 0.5, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent.

In a case of a polyacrylonitrile copolymer including a repeating unit represented by Chemical Formula 2 or 3, a small amount of hydrophobicity is given to the entire copolymer due to the presence of a phenylene group included in the repeating unit represented by Chemical Formula 2 or 3.

Also, the hydrophilicity and hydrophobicity of the entire copolymer may be adjusted by appropriately controlling the $R^1$ and $R^2$ substituents.

As stated above, the thickness of the skin layer 101 of the membrane may be decreased by adjusting the hydrophilicity and the hydrophobicity of the polyacrylonitrile copolymer.

The copolymer may have a weight average molecular weight of about 10,000 to about 500,000, about 10,000 to about 400,000, or about 10,000 to about 200,000. When the weight average molecular weight falls in the above range, it is easier to control a pore structure. When the weight average molecular weight is more than about 500,000, viscosity, which is an important factor for manufacturing a membrane, is increased and the formation of pores may be adversely affected.

The copolymer may have polydispersity of about 1.0 to about 10.0. Within the range, the physical properties of the membrane may be reproduced with relative ease.

The copolymer may include a repeating unit represented by the following Chemical Formula 4.

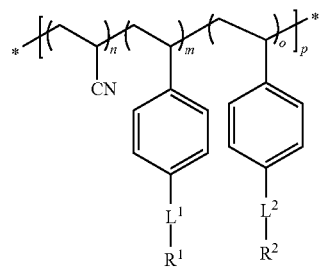

[Chemical Formula 4]

In Chemical Formula 4, when the sum of n, m, and o is 1, n ranges from 0.5 to 0.99, and m+o ranges from 0.01 to 0.5, p is an integer ranging from 10 to 10,000, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent.

When a polyacrylonitrile copolymer is formed in the same order of the repeating unit represented by the above Chemical Formula 4, the merit of the polyacrylonitrile homopolymer is maintained while the wettability of the polyacrylonitrile is more easily controlled.

The copolymer may include a repeating unit represented by the following Chemical Formula 5.

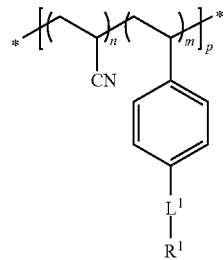

[Chemical Formula 5]

In Chemical Formula 5, when the sum of n and m is 1, n ranges from 0.5 to 0.99, and m ranges from 0.01 to 0.5, p is an integer ranging from 10 to 10,000, $L^1$ is —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, and $R^1$ is a hydrophilic or hydrophobic substituent.

It is relatively easy to control the substitution ratio of a hydrophilic or hydrophobic substituent, the weight average molecular weight, and the polydispersity of the polyacrylonitrile copolymer including the repeating unit represented by the above Chemical Formula 5, compared with the polyacrylonitrile copolymer including the repeating unit represented by the above Chemical Formula 4. Also, the polyacrylonitrile copolymer including the repeating unit represented by the above Chemical Formula 5 may be more advantageous in terms of product yield and refining of a product than the polyacrylonitrile copolymer including the repeating unit represented by the above Chemical Formula 4.

The hydrophilic substituent may include —OH, —SH, —NH$_2$, —COOH, —SO$_3$H, a halogen, salts thereof, or a combination thereof, and the hydrophilic substituent may include a low molecular group, an oligomeric group, or a polymeric group. However, they are not limited thereto.

In addition, the low molecular group may have a molecular weight of about 1000 or less; the oligomeric group may have a molecular weight of about 1500 or less or a molecular weight of about 1000 to 1500; and the polymeric group may have a weight average molecular weight of about 1500 to 500,000, a weight average molecular weight of about 1500 to 400,000, a weight average molecular weight of about 1500 to 200,000, a weight average molecular weight of about 1500 to 10,000, or a weight average molecular weight of about 10,000 to 200,000. However, they are not limited thereto.

The hydrophobic substituent may include a substituted or unsubstituted C1 to C10 alkyl group, a substituted or unsubstituted C5 to C30 aryl group, a fluorinated substituent or combination thereof, and the hydrophobic substituent may be a low molecular group, an oligomeric group, or a polymeric group. However, they are not limited thereto.

In addition, the low molecular group may have a molecular weight of about 1000 or less; the oligomeric group may have a molecular weight of about 1500 or less or a molecular weight of about 1000 to 1500; and the polymeric group may have a weight average molecular weight of about 1500 to 500,000, a weight average molecular weight of about 1500 to 400,000, a weight average molecular weight of about 1500 to 200,000, a weight average molecular weight of about 1500 to 10,000, or a weight average molecular weight of about 10,000 to 200,000. However, they are not limited thereto.

In the fluorinated substituent, the substituent may be a substituted or unsubstituted C1 to C10 alkyl group, a substituted or unsubstituted C5 to C30 aryl group, or a combination thereof.

According to another non-limiting embodiment, a method of manufacturing a membrane including the skin layer 101 and the porous layer 102 may include the following processes: preparing a organic solution including about 5 wt % to about 30 wt % of a polyacrylonitrile-based copolymer, about 1 wt % to about 10 wt % of a pore-forming agent, and about 60 wt % to about 94 wt % of an organic solvent, applying the organic solution to a substrate, and dipping the substrate applied with the organic solution in a non-solvent.

The ratio of a thickness of the skin layer 101 to the thickness of the porous layer 102 may be about 0.01 or less, the thickness of the skin layer 101 may be about 1 μm or less, and the polyacrylonitrile-based copolymer may include a hydrophobic side chain and/or a hydrophobic repeating unit.

A membrane may be fabricated by using an organic solution composition including about 5 to 30 wt % of the polyacrylonitrile-based copolymer, about 1 to 10 wt % of the pore-forming agent, and about 60 to 94 wt % of the organic solvent. Such ranges may provide a membrane according to a non-solvent induced phase separation (NIPS).

The non-solvent induced phase separation is a method of fabricating a membrane that may include dissolving a polymer in a solvent and dipping the same in a non-solvent. The method provides a membrane relatively easily and economically, and may be applied to provide various membranes.

The membrane may have a structural factor (S) of about 500 μm or less, for example, about 200 μm or less.

In addition, the porous layer 102 may have porosity of about 0.5 or more, tortuosity of about 2.5 or less, and a thickness of about 200 μm or less.

The detailed description regarding the structural factor is omitted since it may be as discussed in connection with the above embodiment.

A method of manufacturing a membrane including a polyacrylonitrile-based copolymer including a repeating unit represented by the following Chemical Formula 1, a repeating unit represented by the following Chemical Formula 2, and a repeating unit represented by the following Chemical Formula 3 is provided.

[Chemical Formula 1]

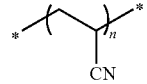

[Chemical Formula 2]

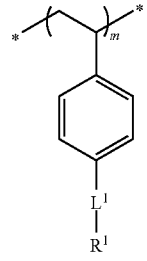

[Chemical Formula 3]

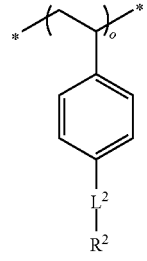

In Chemical Formulae 1 to 3, when the sum of n, m, and o is 1, n ranges from 0.5 to 0.99 and m+o ranges from 0.01 to 0.5, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent.

The polyacrylonitrile-based copolymer may be as discussed in connection with the copolymer according to the above embodiment, so the detailed description is omitted.

The substrate may be a glass plate or a polyester non-woven fabric, but is not limited thereto.

The coating the organic solution on the substrate may be performed by coating the organic solution on the substrate in a thickness of about 100 to 300 μm. The thickness range may be adjusted according to a required thickness of the membrane.

The pore-forming agent may include polyvinylpyrrolidone, polyethylene glycol, polyethyloxazoline, glycerol, ethylene glycol, diethylene glycol, ethanol, methanol, acetone, phosphoric acid, acetic acid, propanoic acid, lithium chloride, lithium nitrate, lithium perchlorate, or a combination thereof, but is not limited thereto.

The organic solvent may include dimethyl formamide, dimethylsulfoxide, dimethylacrylamide, methylpyrrolidone, or a combination thereof, but is not limited thereto.

The non-solvent is a general item that may be acquired relatively easily. For instance, water may be the non-solvent, because it is advantageous in terms of price.

According to another non-limiting embodiment, a composite membrane may include a polymer layer, and a support that includes the membrane in accordance with an example embodiment described above and formed on one or both sides of the polymer layer.

The membrane may be manufactured in the form of a single layer by using the polyacrylonitrile-based copolymer prepared in accordance with a non-limiting embodiment, or the membrane may be manufactured in the form of a composite membrane by using the polyacrylonitrile-based copolymer as a support and causing it to be bonded with a polymer layer.

As described above, when a forward osmotic water treatment module is used, the composite layer-type membrane may be more appropriate.

The support may have a thickness ranging from about 0.01 μm to about 500 μm. Within the range, not only may the water flux be maintained, but also the membrane may have a proper hardness.

The polymer layer may be a microfiltration membrane, an ultrafiltration membrane, a nanofiltration membrane, a reverse osmotic membrane, or a forward osmotic membrane.

A water treatment module using a membrane manufactured according to a non-limiting embodiment may be provided.

The water treatment module may be based on forward osmosis, but the scope of this disclosure is not limited thereto.

A forward osmosis module is described hereafter using desalination as an example.

Forward osmosis is a method of bringing a high-concentration inducing solute and sea water into contact with a semipermeable membrane between them to thereby make fresh water from the sea water to be absorbed into the inducing solute and then separating the fresh water out of the inducing solute.

Forward osmotic desalination is a process of transmitting fresh water out of the sea water toward a high-concentration solution based on an osmosis phenomenon between both sides of the membrane by using the inducing solute, separating/condensing the inducing solute in the diluted inducing solution, and reusing the inducing solute.

Hereinafter, various embodiments are illustrated in more detail with reference to the following examples. However, it should be understood that the following are merely example embodiments and should not be construed as limiting.

Preparation of Polyacrylonitrile-Based Copolymer

Example 1

A polyacrylonitrile copolymer including a repeating unit represented by the following Chemical Formula 6 is prepared.

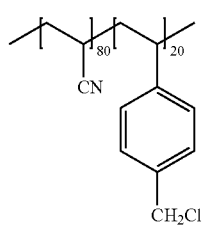

[Chemical Formula 6]

When it is assumed that the amount of acrylonitrile is about 20 g (376.9 mmol), the amount of chloromethylstyrene is about 15.47 g (94.2 mmol), and the amount of acrylonitrile and chloromethylstyrene is about 100 wt %, about 0.5 wt % of azobisisobutyronitrile (AIBN), which is a radical initiator, is put into refined tetrahydrofuran (THF) and the mixed solution is agitated at about 60° C. for about 24 hours.

The solution acquired after the agitation is cooled to room temperature, and a polymer is dipped using a mixed solvent of ethanol and hexane mixed at a weight ratio of about 3:1. The dipped polymer is sufficiently rinsed with methanol and water, and is dried to thereby obtain a polyacrylonitrile copolymer.

Example 2

A polyacrylonitrile copolymer including a repeating unit represented by the following Chemical Formula 7 is prepared.

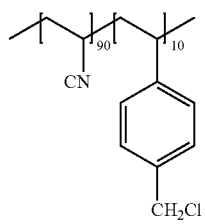

[Chemical Formula 7]

About 22.5 g (424 mmol) of acrylonitrile, about 7.73 g (47 mmol) of chloromethylstyrene, and about 0.5 wt % of radical initiator of azobisisobutyronitrile (AIBN), wherein the amount of the acrylonitrile and chloromethylstyrene is about 100 wt %, are added into the purified tetrahydrofuran (THF), and the mixture is agitated at about 60° C. for about 24 hours.

The agitated solution is cooled to room temperature, and the polymer is dipped using a mixed solvent (weight ratio of 3:1) of ethanol and hexane. The dipped polymer is sufficiently washed with methanol and water and dried to provide a polyacrylonitrile copolymer.

Comparative Example 1

A polyacrylonitrile homopolymer is used.
Manufacturing Membrane

Example 3

A membrane is manufactured using the polyacrylonitrile copolymer prepared according to Example 1.

A composition is prepared by dissolving about 5 g of the polyacrylonitrile copolymer prepared according to Example 1 in about 25.67 g of dimethyl formamide, and dissolving about 1.33 g of lithium chloride and about 1.33 g of polyvinylpyrrolidone. The prepared composition is poured onto a polyester non-woven fabric set on a glass plate, and the coating liquid thickness is controlled by using a film applicator. Subsequently, a water treatment membrane including a polymer layer having a thickness of about 200 μm is manufactured by dipping the filtration membrane coated with the coating liquid in an aqueous solution at room temperature for about 24 hours, and then drying it.

Example 4

A membrane is manufactured according to the same method as Example 3, except that the polyacrylonitrile copolymer prepared according to Example 2 is used instead of the polyacrylonitrile copolymer prepared according to Example 1.

Comparative Example 2

A membrane is manufactured according to the same method as Example 3, except that the polyacrylonitrile copolymer prepared according to Comparative Example 1 is used instead of the polyacrylonitrile copolymer prepared according to Example 1.
Contact Angle of Polymer The contact angles of the copolymers prepared according to Examples 1 and 2 with respect to water and the contact angle of the homopolymer prepared according to Comparative Example 1 with respect to water are measured.

The contact angles are measured using distilled water as a wetting liquid. Specimens of the copolymers prepared according to Examples 1, 2, and 3 and Comparative Example 1 are prepared in a standard state and dried using a lyophilizer, and then the static contact angles are measured more than 5 times and an average value thereof is obtained.

Figure 5:
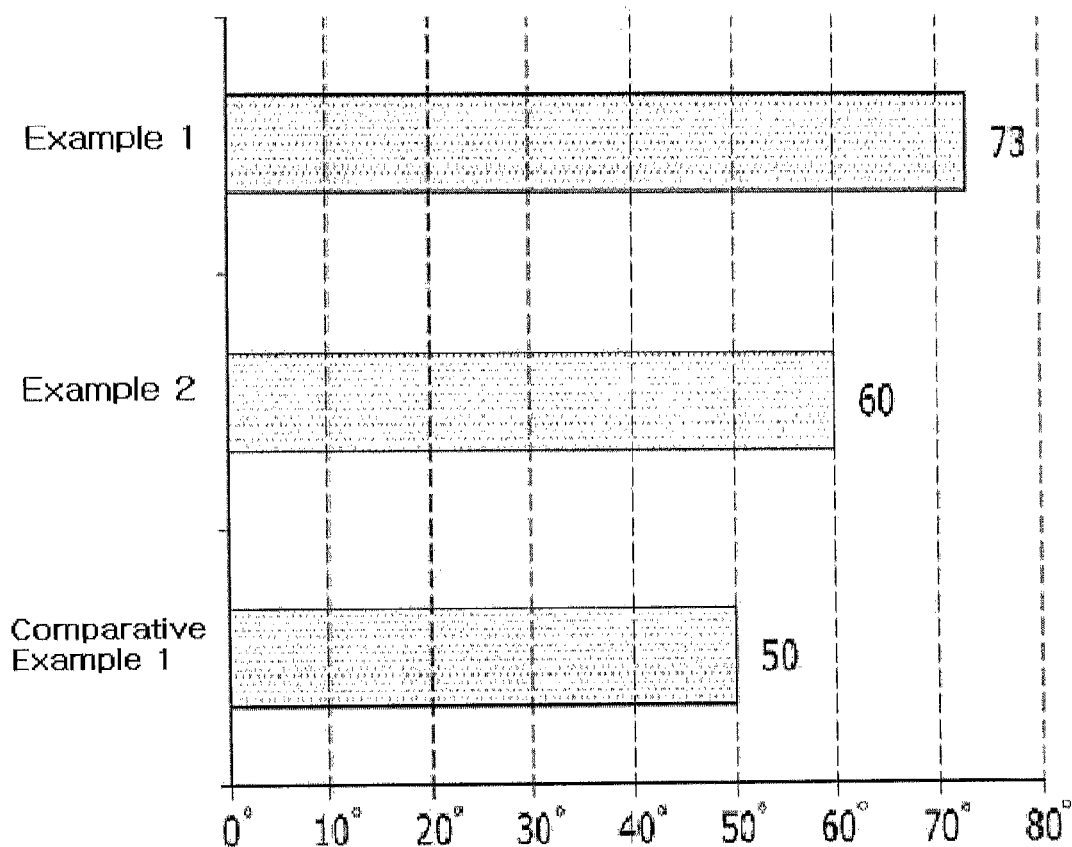
FIG. 5 shows data of contact angles of copolymers prepared according to Examples 1 and 2 and a homopolymer prepared according to Comparative Example 1 with respect to water.

FIG. 5 shows data of the contact angles of the copolymers prepared according to Examples 1 and 2 and the homopolymer prepared according to Comparative Example 1 with respect to water.

The contact angle of the copolymer prepared according to Example 1 averages about 73°, and the contact angle of the copolymer prepared according to Example 2 averages about 60°.

Figure 6:
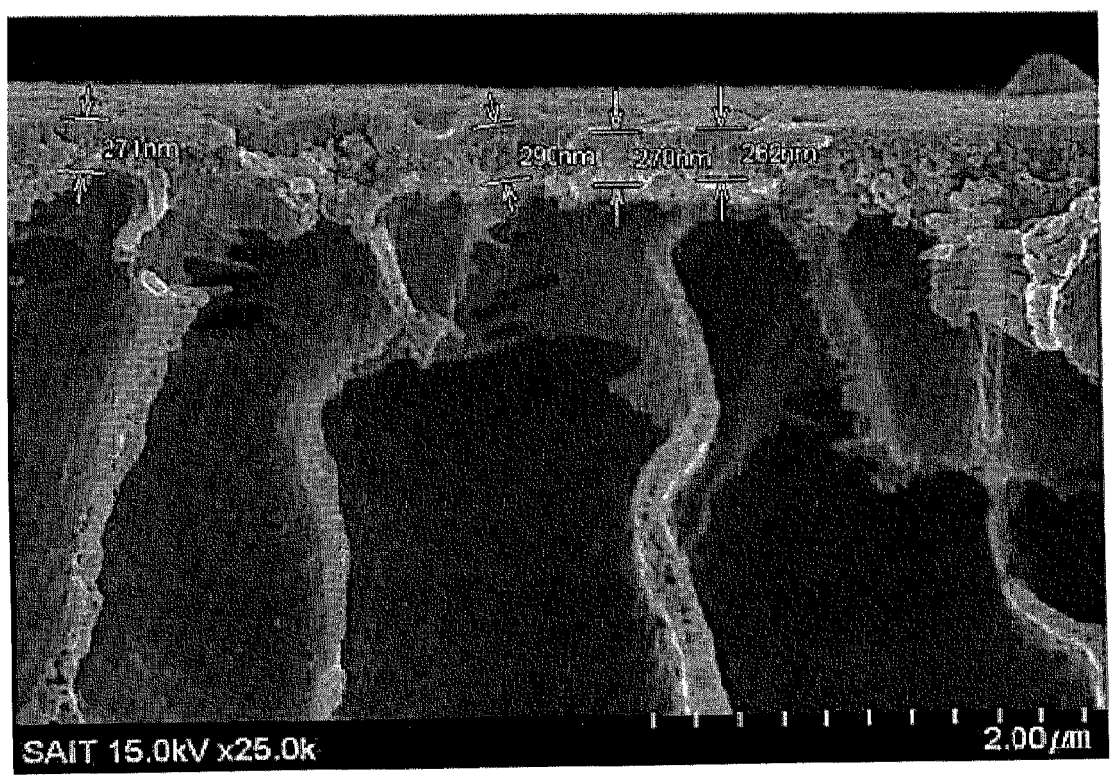
FIG. 6 is a SEM photograph showing a cross-section of a membrane formed according to Example 3.
Figure 7:
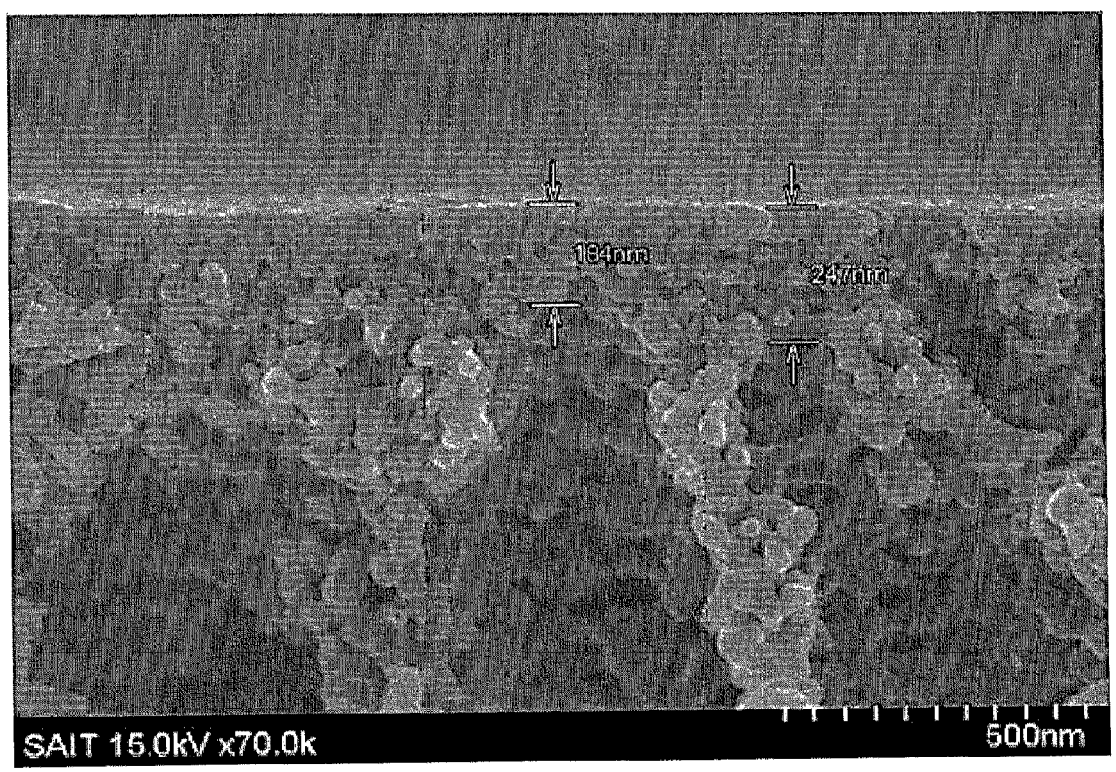
FIG. 7 is a SEM photograph showing a cross-section of a membrane formed according to Example 4.
Figure 8:
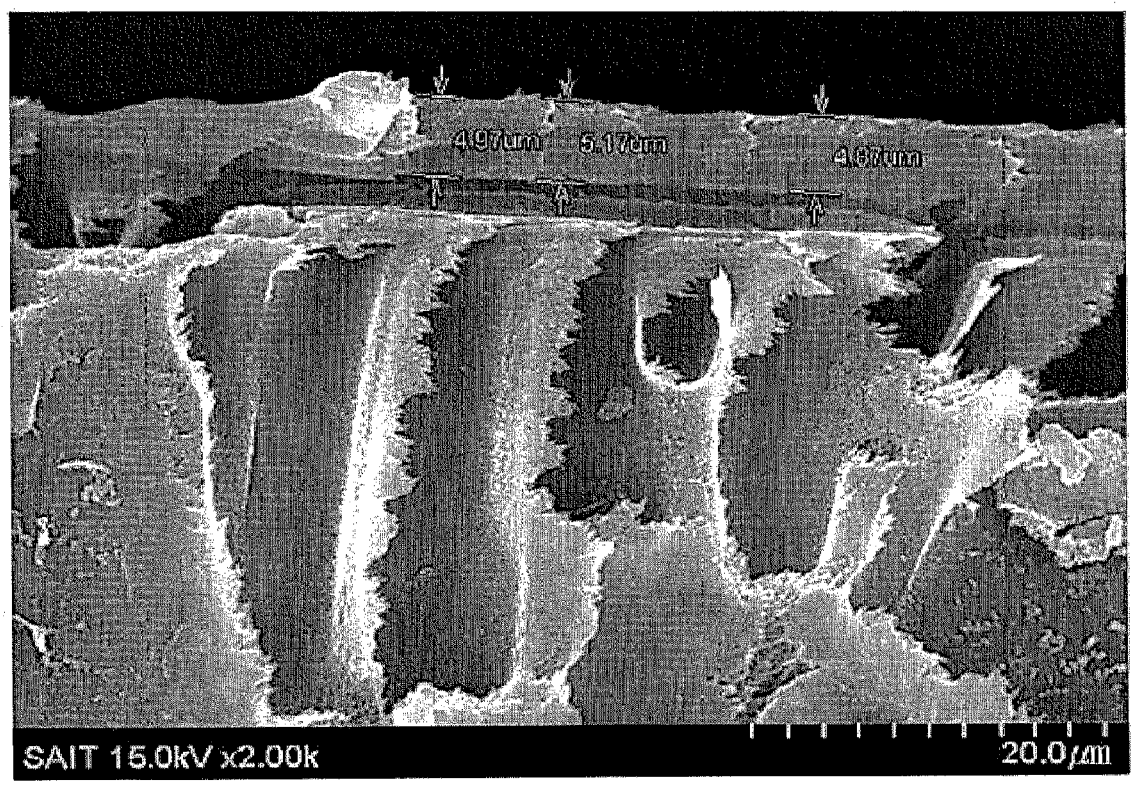
FIG. 8 is a SEM photograph showing a cross-section of a membrane formed according to Comparative Example 2.

On the other hand, the contact angle of the homopolymer prepared according to Comparative Example 1 averages about 50°, so the copolymers prepared according to Examples 1 and 2 are more hydrophobic than the homopolymer prepared according to Comparative Example 1.
SEM Photograph of Membrane FIG. 6 is a SEM photograph showing a cross-section of the membrane formed according to Example 3, and FIG. 7 is a SEM photograph showing a cross-section of the membrane formed according to Example 4. Also, FIG. 8 is a SEM photograph showing a cross-section of the membrane formed according to Comparative Example 2.

From the drawings, the thickness of the skin layer of each membrane is measured.

The membrane obtained from Example 3 has a skin layer thickness of about 0.2 to 0.4 μm, and the membrane obtained from Example 4 has a skin layer thickness of about 0.2 to 0.3 μm.

On the other hand, the membrane obtained from Comparative Example 2 has a skin layer thickness of about 4.5 to 5 μm, which is thicker than those obtained from Examples 3 and 4.
Measurement of Water Flux of Manufactured Membrane The water flux of the membrane manufactured according to Example 3 and the membrane manufactured according to Comparative Example 2 are measured.

The manufactured membrane is set in a cell having an effective area of about 600 $cm^2$ for measurement and compressed under a pressure of about 2 $kg/cm^2$ for about 2 hours, and is then measured under pressure of about 1 $kg/cm^2$.

The measurement values are presented in the following Table 1.

TABLE 1

|  | Polymer | Water flux (LMH) |
| --- | --- | --- |
| Example 3 | Example 1 | 434 |
| Comparative Example 2 | Comparative Example 1 | 22 |

LMH denotes the amount of water permeating per unit time, L denotes the amount (liters) of water permeating through the membrane, while M denotes the area ($m^2$) of the membrane and H denotes permeating time (hours). In short, it is an estimation unit for determining how many liters of water permeate through the membrane of an area of 1 $m^2$ in one hour.

As shown in Table 1, the amount of water permeation of the membrane according to Example 3 is more than about 20 times that of the membrane according to Comparative Example 2.
Structural Factor of Obtained Membrane The membrane obtained from Example 3 and the membrane obtained from Comparative Example 2 are measured for a structural factor.

The structural factor of the membrane obtained from Example 3 is calculated as follows.

First, the porosity is about 0.5 or less, which is measured according to Mercury extrusion. The tortuosity is estimated to be about 1 by confirming that the pores have a finger structure through SEM. The thickness is about 100 μm, which is measured by SEM photograph.

The structural factor calculated from the values is about 200 to about 250 μm.

The structural factor of the membrane obtained from Comparative Example 2 is calculated as follows.

The structural factor of the membrane obtained from Comparative Example 2 is measured according to the following method. The thickness is about 160 μm, which is measured by a SEM photograph.

In Comparative Example 2, the skin layer had a thickness of about 4 μm which is obtained by referencing the structural factor of the porous layer (S=200 to 250 μm per 1 μm) in the reference (Journal of membrane science, 355 2010 158-167) having a similar structure to Comparative Example 2.

In other words, it is calculated by porous layer (4*200 μm)+skin layer (1*160/0.5 μm).

The calculated structural factor is about 1120 μm.

Figure 9:
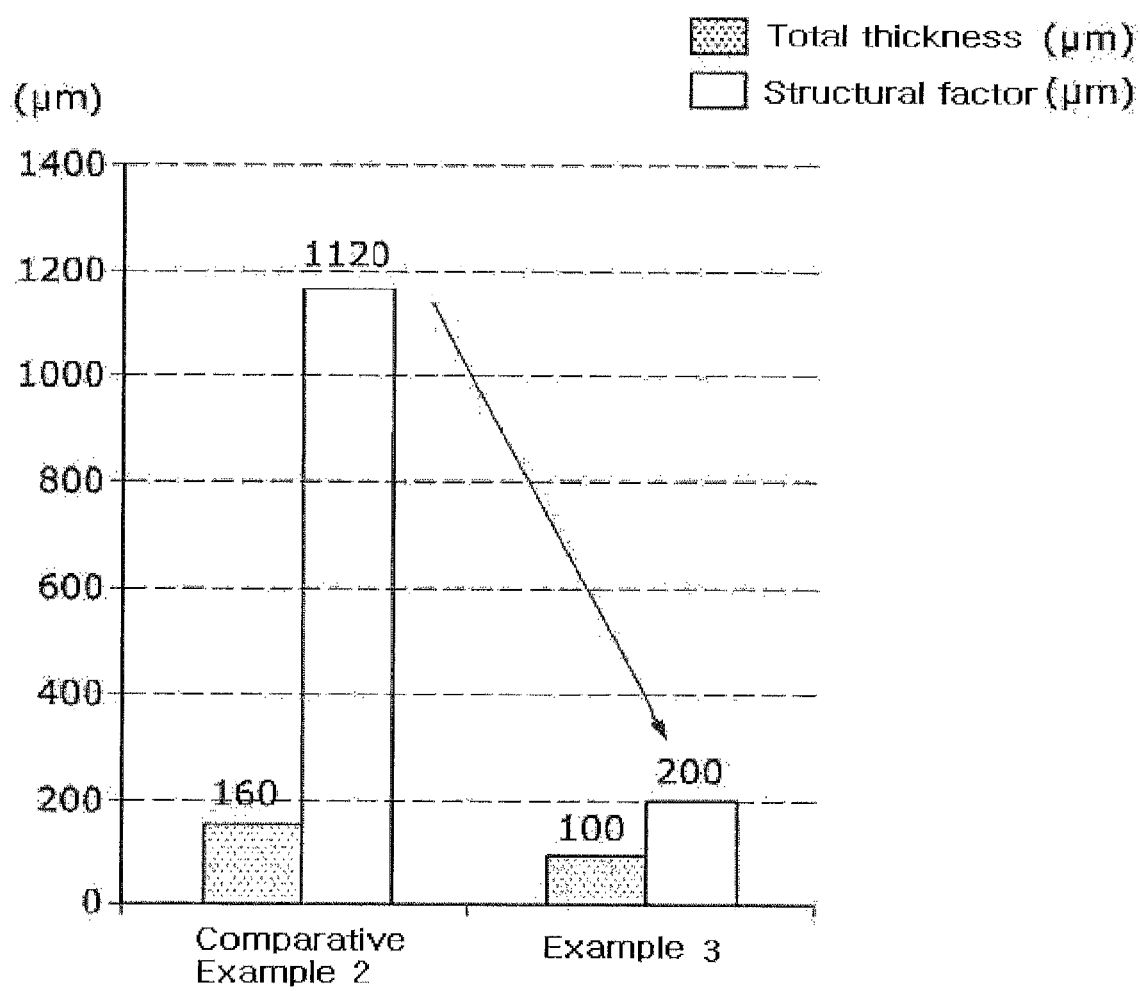
FIG. 9 shows data comparing a thickness and a structural factor of membranes according to Example 3 and Comparative Example 2.

FIG. 9 shows data of comparing the thickness and the structural factor of the membranes obtained from Example 3 and Comparative Example 2.

It is understood that the structural factor of the membrane obtained from Example 3 is lower than the structural factor of the membrane obtained from Comparative Example 2. From the results, it is also understood that the membrane obtained from Example 3 is more effective in the view of water flux.

While various example embodiments are described herein, it is to be understood that the disclosure is not limited to such embodiments. Rather, the disclosure is intended to cover various modifications and equivalent arrangements included within the spirit and scope of the appended claims. Therefore, the aforementioned embodiments should be understood to be merely examples but not limiting in any way.

DESCRIPTION OF SYMBOLS

101: skin layer
102: porous layer
201: polyacrylonitrile homopolymer
202: solvent
301: polyacrylonitrile-based copolymer
302: solvent
303: hydrophobic repeating unit
1: substrate
2: droplet

What is claimed is:

1. A membrane, comprising:
a skin layer and a porous layer, the skin layer and the porous layer including a polyacrylonitrile-based copolymer, the polyacrylonitrile-based copolymer consisting of a repeating unit represented by Chemical Formula 1; and at least one selected from a repeating unit represented by Chemical Formula 2 and a repeating unit represented by Chemical Formula 3:

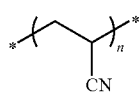

[Chemical Formula 1]

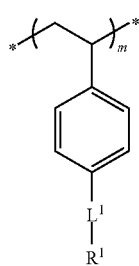

[Chemical Formula 2]

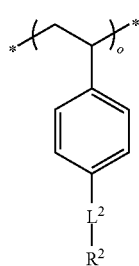

[Chemical Formula 3]

wherein, in Chemical Formulae 1 to 3,
when the sum of n, m, and o is 1, n ranges from 0.8 to 0.99 and m+o ranges from 0.01 to 0.2, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent, a thickness ratio of the skin layer relative to the porous layer being about 0.01 or less, the skin layer having a thickness of about 1 μm or less, and the membrane having a structural factor (S) of about 500 μm or less.

2. The membrane of claim 1, wherein the porous layer has a porosity of about 0.5 or more, a tortuosity (τ) of about 2.5 or less, and a thickness (τ) of about 200 μm or less.

3. The membrane of claim 1, wherein the polyacrylonitrile-based copolymer has a weight average molecular weight (Mw) of about 10,000 to about 500,000.

4. The membrane of claim 1, wherein the polyacrylonitrile-based copolymer has a polydispersity of about 1.0 to about 10.0.

5. The membrane of claim 1, wherein the polyacrylonitrile-based copolymer includes a repeating unit represented by the following Chemical Formula 4:

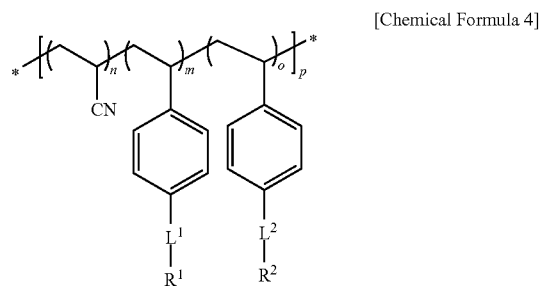

[Chemical Formula 4]

wherein, in Chemical Formula 4, when the sum of n, m, and o is 1, n ranges from 0.8 to 0.99 and m+o ranges from 0.01 to 0.2, p is an integer ranging from 10 to 10,000, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent.

6. The membrane of claim 1, wherein the polyacrylonitrile-based copolymer includes a repeating unit represented by the following Chemical Formula 5:

[Chemical Formula 5]

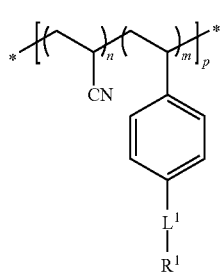

wherein, in Chemical Formula 5, when the sum of n and m is 1, n ranges from 0.8 to 0.99 and m ranges from 0.01 to 0.2, p is an integer ranging from 10 to 10,000, $L^1$ is —CR'R"—, —NR'—, —S—, —S(O)$_2$—, —O—, —C(O)O—, —NRC(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, and $R^1$ is a hydrophilic or hydrophobic substituent.

7. The membrane of claim 1, wherein the hydrophilic substituent includes —OH, —SH, —NH$_2$, —COOH, —SO$_3$H, a halogen, salts thereof, or a combination thereof.

8. The membrane of claim 1, wherein the hydrophobic substituent includes a substituted or unsubstituted C1 to C10 alkyl group, a substituted or unsubstituted C5 to C30 aryl group, a fluorinated substituent, or a combination thereof.

9. A composite membrane comprising a polymer layer; and a support disposed on at least one side of the polymer layer, the support including the membrane according to claim 1.

10. The composite membrane of claim 9, wherein the support has a thickness of about 0.01 μm to about 500 μm.

11. The composite membrane of claim 9, wherein the polymer layer is a microfiltration membrane, an ultrafiltration membrane, a nanofiltration membrane, a reverse osmotic membrane, or a forward osmotic membrane.

12. A method of manufacturing a membrane including a skin layer and a porous layer, a thickness ratio of the skin layer relative to the porous layer being about 0.01 or less, the skin layer having a thickness of 1 μm or less, and the membrane having a structural factor (S) of about 500 μm or less, the method comprising:

preparing an organic solution including about 5 wt % to about 30 wt % of a polyacrylonitrile-based copolymer, about 1 wt % to about 10 wt % of a pore-forming agent, and about 60 wt % to about 94 wt % of an organic solvent, the polyacrylonitrile-based copolymer consisting of a repeating unit represented by Chemical Formula 1; and at least one selected from a repeating unit represented by Chemical Formula 2 and a repeating unit represented by Chemical Formula 3:

[Chemical Formula 1]

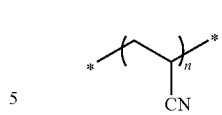

[Chemical Formula 2]

[Chemical Formula 3]

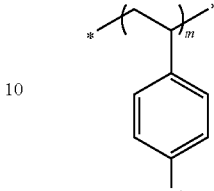

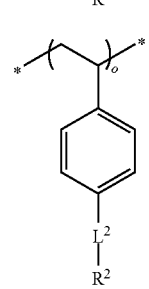

wherein, in Chemical Formulae 1 to 3, when the sum of n, m, and o is 1, n ranges from 0.8 to 0.99 and m+o ranges from 0.01 to 0.2, $L^1$ and $L^2$ are the same or different and are each independently —CR'R"—, —NR'—, —S—, —S(O)$_2$—, —O—, —C(O)O—, —NR'C(O)—, or a combination thereof, R' and R" are the same or different and are each independently hydrogen, deuterium, a substituted or unsubstituted C1 to C10 alkyl group, a substituted or unsubstituted C6 to C30 aryl group, a substituted or unsubstituted C3 to C30 heteroaryl group, a halogen, or a combination thereof, $R^1$ is a hydrophilic or hydrophobic substituent, and $R^2$ is a hydrophilic or hydrophobic substituent;

applying the organic solution to a substrate to form an applied substrate; and dipping the applied substrate in a non-solvent.

13. The method of claim 12, wherein the porous layer has a porosity of about 0.5 or more, a tortuosity (τ) of about 2.5 or less, and a thickness (τ) of about 200 μm or less.

14. The method of claim 12, wherein the applying the organic solution to a substrate is a process of coating the substrate with the organic solution to a thickness of about 100 μm to about 300 μm.

15. The method of claim 12, wherein the preparing an organic solution includes adding a pore-forming agent that comprises polyvinylpyrrolidone, polyethylene glycol, polyethyloxazoline, glycerol, ethylene glycol, diethylene glycol, ethanol, methanol, acetone, phosphoric acid, acetic acid, propanoic acid, lithium chloride, lithium nitrate, lithium perchlorate, or a combination thereof.

16. The method of claim 12, wherein the preparing an organic solution includes adding an organic solvent that comprises dimethyl formamide, dimethylsulfoxide, dimethylacrylamide, methylpyrrolidone, or a combination thereof.

* * * * *